March 18, 1952     J. WOLF     2,589,914
ENDLESS CHAIN-TYPE POWER-DRIVEN SAW
Filed March 20, 1947
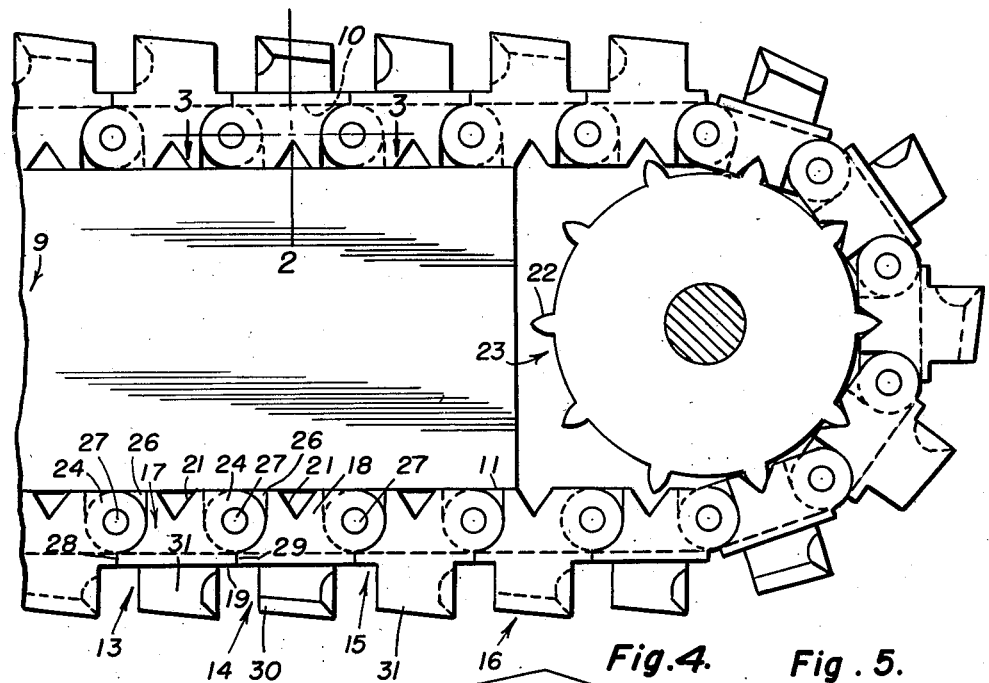
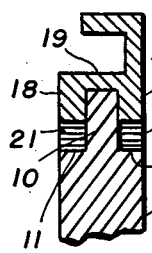
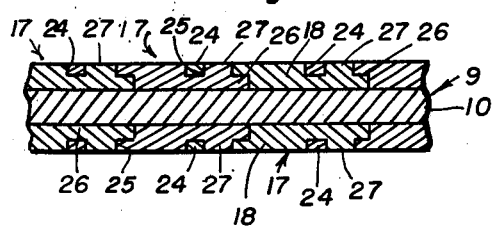
Inventor
Joseph Wolf
By *Clarence A. O'Brien
and Harvey B. Jacobson*
Attorneys Patented Mar. 18, 1952

2,589,914

UNITED STATES PATENT OFFICE 2,589,914

ENDLESS CHAIN-TYPE POWER-DRIVEN SAW

Joseph Wolf, Hood River, Oreg.

Application March 20, 1947, Serial No. 735,909

4 Claims. (Cl. 143—32)

The present invention relates to motor driven and equivalent power-type saws in which the cutter means is of an endless chain form, more specifically, an endless chain whose links are in the form of companion and alternate cutters moving and coacting in predetermined and proper sequence.

As the opening statement of the invention implies, endless chain saws are not new. As a matter of fact, it is common to the trade to provide a portable motorized saw having a frame in the form of a plate, the marginal edge of the plate constituting an endless track, and the links of the chain being operable in proper order around the length of the track. Various ways are employed to propel the chain and, as a general rule, this is accomplished by employing sprocket links in which the links have V-notches to accommodate V-teeth on a driven sprocket wheel.

One object of the invention at hand has to do with what is believed to be an improved track, this being formed by providing a central endless flange around the marginal edge of the frame-plate, said flange serving to accommodate channel-like links and also serving to provide ledges on opposite sides of the flange, the edges of the links constituting shoes which ride firmly in contact with said ledges.

Another object of the invention, also structural and functional in nature, is to provide improved links, both rakers and cutters, said links being separably interconnected to form the endless chain, and all of said links having correspondingly constructed channel-shaped body portions, the side walls of the channels constituting the aforementioned tracking shoes for the ledges, and the channelways serving to permit said links to be saddled over the endless flange for stability in assembling and operation.

An object of the invention is to provide a guide supporting and track arrangement with a link chain construction, the links being of the stated type and the blade portions thereon being relatively stubby in construction in order to distribute stress and strain and to permit the blades to lie in a plane close to the marginal edge portions of the frame plate.

In certain types of endless chain-type saws, the cutting and raking links travel high in relation to the marginal guide or tracking rail of the frame. It is important, however, that the path traveled by the links should be in an unwavering, and therefore constantly straight line. It is, consequently, another object of the invention to so construct the links and to associate same with the track that proper alignment and travel motion of the links is assured under all ordinary circumstances.

Other objects and advantages of the invention will become more readily apparent from the following description and the accompanying illustrative drawings.

In the drawings, wherein like numerals are employed to designate like parts throughout the views:

Figure 1 is a fragmentary side elevational view of an end portion of a power-type saw constructed in accordance with the principles of the instant invention.

Figure 2 is a vertical section on the line 2—2 of Figure 1.

Figure 3 is a horizontal section at right angles to Figure 2, also fragmentary, and on the line 3—3 of Figure 1, looking in the direction of the arrows.

Figure 4 is a perspective view showing, in detail, one of the cutter chain links having the basic characteristics of all other links which go to make up the chain.

Figure 5 is an end view of Figure 2.

Figure 6 is an end view of one of the cutter teeth links forming part of the present invention.

Referring now to the drawings by distinguishing reference numerals, the frame is in the form of a flat solid plate 9 here shown as of general ovate form in marginal outline. The marginal edge of the plate is reduced in thickness to provide a central outstanding track-flange 10, sometimes referred to in the art as a guide rail, which flange coacts with endless shoulders or ledges 11 and 12, as brought out to advantage in Figure 2. The endless cutter-chain is made up of a plurality of complemental and separably connected links. All of the links are fundamentally the same as far as the essential features of body construction are concerned. However, there are different species or varieties in the link assemblage and these are distinguished and differentiated as cutters and rakers. To assist in understanding the disclosure, the four links at the lower right in Figure 1 run in the order of a left cutter 13, left raker 14, right cutter 15 and right raker 16. It is understood, of course, that the order and sequence of links is of no particular moment insofar as the inventive ideas are here concerned, for I am primarily concerned, on the one hand, with the construction of a plate 9 with the ledges 11 and 12 on opposite sides of the central endless track flange 10, on the one hand, and the construction of the links individually and in conjunction with the track, which latter construction is brought out, for instance, in Figure 4. In this figure, which depicts a typical link, the body proper is of channel-shaped form, that is, channel-shaped in cross-section, said body being denoted at 17. The channel walls or flanges 18 ride in contact with the sides of the flange 10 and the connective web 19 rides in contact with the marginal edge of said flange 10. The edge portions 20 of the side flanges constitute shoes and these ride in contact with the track ledges or shoulders 11 and 12. It follows that we have a channel-shaped link which is saddled over the flange with the shoes riding in contact with the ledges 11 and 12, as shown in Figure 2. The side flanges are also formed with V-shaped notches 21 to accommodate the correspondingly shaped teeth 22 on the sprocket wheel 23. The sprocket wheel is driven from any suitable prime mover or other source of power. It is also to be noticed in Figure 4 that the left hand ends of the flanges are thinned interiorly on opposed faces to define assembling ears 24, these being centrally apertured, as at 25, to hingedly and separably join studs. The right hand ends of said flanges are exteriorly gouged and thus thinned to define additional ears 26 having hinging studs or pins 27 projecting therefrom. Thus, the respective links are alternately interfitted and overlapped in customary link fashion to provide the requisite drive and features of flexibility at the same time.

Attention is also directed to the transverse end portions of the channel-shaped link bodies which rise up above the ears 24 and 26 to define thrust and abutment shoulders 28 and 29, respectively. As before stated, the links are provided with suitable cutting and raking teeth. The raker teeth are denoted by the numerals 30 and the cutters by the numerals 31.

As will be gleaned, the reader having studied the drawings of the preferred embodiment of the invention in conjunction with the description thereof, novelty is thought to reside, on the one hand, in the marginally flanged plate forming the track-equipped frame, the same in conjunction with channel-shaped links interconnected and hinged, said links being such as to saddle over the track-flange with their edge portions riding in contact with the ledges on opposite sides of said flange. It follows that, thus constructed, the arrangement is characterised by stability, efficiency in operation and appropriateness in construction from the standpoint of the manufacturer and the users alike.

Having now described the invention herein disclosed in full, clear and seemingly appropriate terms, this with a view toward enabling persons skilled in the art to make, construct and use the same; and, having explained those principles which distinguish it from other inventions in the same category, I hereby and now particularly point out and distinctly claim such phases and aspects thereof which I desire, to enable me to obtain exclusive rights thereto.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

I claim:

1. In a power-type endless chain saw of the class described, in combination, a rigid body plate provided with a marginal flange functioning as a track for a chain, said flange being of a cross-section appreciably less than the cross section of the plate and defining and providing chain-tracking ledges, and a chain made up of a plurality of interconnected hingedly connected links, said links being channel-shaped in cross-section and provided at corresponding ends with apertured ears and at opposite corresponding ends with lug-equipped ears, the apertured ears overlapping the lug-equipped ears and being hingedly attached to the latter by way of the lugs.

2. In a power-type endless chain saw of the class described, in combination, a rigid body plate provided with a marginal flange functioning as a track for a chain, said flange being of a cross-section appreciably less than the cross section of the plate and defining and providing chain-tracking ledges, and a chain made up of a plurality of interconnected hingedly connected links, said links being channel-shaped in cross-section and provided at corresponding ends with apertured ears and at opposite corresponding ends with lug-equipped ears, the apertured ears overlapping the lug-equipped ears and being hingedly attached to the latter by way of the lugs and the transverse end portions of the respective links, outwardly of the hingedly connected ears, being fashioned into end-thrust abutments and the end-thrust abutments on all links being in firm end-to-end thrust relationship.

3. As a new article of manufacture, a link embodying a tooth-equipped body, the latter being channel-shaped in cross-section and including spaced parallel side walls, the ends of said walls, at one end of said body, having aperture assembling and hinging ears and being provided at their opposite ends with other ears, the latter formed with outstanding assembling and hinging lugs.

4. In a chain construction of the class shown and described, a pair of complemental chain links, each link embodying a tooth-equipped body, said body being of general rectangular form and including a tooth-equipped web portion and a pair of spaced parallel channel-forming walls, corresponding ends of said walls at one end of the body having apertured assembling and hinging ears, the opposite end of said body having spaced parallel solid ears with externally disposed outstanding studs forming assembling and hinging journals, the apertured ears on one link overlapping the stud-equipped ears on the remaining link and being hingedly attached to the latter by way of said studs.

JOSEPH WOLF.

REFERENCES CITED

The following references are of record in the file of this patent:

UNITED STATES PATENTS

| Number | Name | Date |
|---|---|---|
| 553,286 | Koehler | Jan. 21, 1896 |
| 827,009 | Gray et al. | July 24, 1906 |
| 1,016,664 | Bailey | Feb. 6, 1912 |
| 2,326,854 | Hassler | Aug. 17, 1943 |
| 2,349,573 | Anderson | May 23, 1944 |
| 2,380,753 | Segerstad | July 31, 1945 |

FOREIGN PATENTS

| Number | Country | Date |
|---|---|---|
| 4,966 | Great Britain | Mar. 4, 1908 |